(12) United States Patent
Hsiao et al.

(10) Patent No.: US 11,742,538 B2
(45) Date of Patent: Aug. 29, 2023

(54) LIQUID TANK SYSTEM AND LI-ION BATTERY COOLING SYSTEM THEREWITH

(71) Applicants: Inventec (Pudong) Technology Corp., Shanghai (CN); Inventec Corporation, Taipei (TW)

(72) Inventors: Chi-Cheng Hsiao, Taipei (TW); Yi-Kuan Liao, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 538 days.

(21) Appl. No.: 16/903,341

(22) Filed: Jun. 16, 2020

(65) Prior Publication Data

US 2021/0384571 A1    Dec. 9, 2021

(30) Foreign Application Priority Data

Jun. 9, 2020  (CN) .......................... 202010520012.2

(51) Int. Cl.
| | |
|---|---|
| *H01M 10/6568* | (2014.01) |
| *H01M 10/613* | (2014.01) |
| *H01M 10/625* | (2014.01) |
| *B60L 58/26* | (2019.01) |
| *H01M 10/0525* | (2010.01) |

(52) U.S. Cl.
CPC ......... *H01M 10/6568* (2015.04); *B60L 58/26* (2019.02); *H01M 10/613* (2015.04); *H01M 10/625* (2015.04); *H01M 10/0525* (2013.01); *H01M 2220/20* (2013.01)

(58) Field of Classification Search
CPC .......... H01M 10/6568; H01M 10/613; H01M 10/625; H01M 10/0525; H01M 2220/20; H01M 10/6567; B60L 58/26; B60L 2240/545; B60L 50/64; Y02E 60/10; Y02T 10/70; Y02T 90/16
See application file for complete search history.

(56) References Cited

U.S. PATENT DOCUMENTS

| | | | | |
|---|---|---|---|---|
| 1,613,531 | A  * | 1/1927 | Pfisterer ................. | B01F 25/00 366/173.1 |
| 10,765,033 | B1 * | 9/2020 | Keehn .................... | H05K 7/203 |
| 2005/0067146 | A1 * | 3/2005 | Thayer ............... | G01R 31/2886 165/80.3 |
| 2012/0003510 | A1 * | 1/2012 | Eisenhour .......... | H01M 10/625 429/50 |

(Continued)

*Primary Examiner* — Muhammad S Siddiquee
(74) *Attorney, Agent, or Firm* — Winston Hsu

(57) ABSTRACT

A liquid tank system includes a tank body and a liquid coolant supplying device. The tank body has an accommodating space, a liquid inlet, and an upper outlet. The liquid inlet and the upper outlet communicate with the accommodating space. The accommodating space is sealed except for the liquid inlet and the upper outlet. The liquid coolant supplying device is connected to the liquid inlet so as to continuously provide a liquid coolant to the accommodating space through the liquid inlet. The liquid coolant in the accommodating space overflows out of the tank body through the upper outlet. A Li-ion battery cooling system includes a Li-ion battery and the above liquid tank system. The Li-ion battery is disposed in the accommodating space and submerged in the liquid coolant. The continuously flowing liquid coolant dissipates heat from the lithium battery.

10 Claims, 3 Drawing Sheets

(56) References Cited

U.S. PATENT DOCUMENTS

| | | | |
|---|---|---|---|
| 2014/0335381 A1* | 11/2014 | Krolak | H01M 10/613 |
| | | | 429/50 |
| 2019/0008077 A1* | 1/2019 | Ishinabe | H05K 7/20272 |
| 2019/0383559 A1* | 12/2019 | Aoki | F28D 1/05316 |
| 2022/0013823 A1* | 1/2022 | Schumacher | H01M 10/63 |

* cited by examiner

LIQUID TANK SYSTEM AND LI-ION BATTERY COOLING SYSTEM THEREWITH

BACKGROUND OF THE INVENTION

1. Field of the Invention

The present invention relates to a liquid tank system, and more particularly to a sealed liquid tank system with continuous flow of liquid coolant, and a Li-ion battery cooling system with the liquid tank system.

2. Description of the Prior Art

With the technological development of Li-ion battery, Li-ion battery can be applied to electric vehicles in a cost-effective way. For driving safety, Li-ion battery needs to be tested. Li-ion battery has high chemical reactivity. Defective Li-ion battery may produce much heat, explosion and toxic dense smoke during the test. General test sites of lithium-ion batteries usually only have circuit breakers and fire equipment, which are difficult to protect testers in time and effectively. Furthermore, in general, when the Li-ion battery burns due to a short circuit, due to the high chemical reactivity of lithium, even if a fire extinguisher is used in time (such as its foam or dry powder completely covering the Li-ion battery), the combustion will continue until the lithium in the Li-ion battery is exhausted. Therefore, current treatments to the Li-ion batteries that burn due to short circuit are mostly to put them in an open environment and wait for their lithium to be exhausted. For Li-ion batteries with larger capacity, the above-mentioned continuous combustion will be accompanied by toxic gas and is also easy to cause an explosion, which is harmful to the environment and personnel.

SUMMARY OF THE INVENTION

An objective of the invention is to provide a liquid tank system with continuous flow of liquid coolant and a sealed accommodating space, which can provide effective and rapid heat dissipation and prevent the gas in the accommodating space from spreading around.

A liquid tank system according to the invention includes a tank body and a liquid coolant supplying device. The tank body has an accommodating space, a liquid inlet, and an upper outlet. The liquid inlet and the upper outlet communicate with the accommodating space. The accommodating space is sealed except for the liquid inlet and the upper outlet. The liquid coolant supplying device is connected to the liquid inlet so as to continuously provide a liquid coolant into the accommodating space through the liquid inlet. The liquid coolant in the accommodating space overflows out of the tank body through the upper outlet. Thereby, the accommodating space contains the continuously flowing liquid coolant so as to provide effective and rapid heat dissipation; the sealed accommodating space can prevent the gas in the accommodating space from spreading around.

Another objective of the invention is to provide a Li-ion battery cooling system, which uses the liquid tank system mentioned above to provide a Li-ion battery heat dissipation function and prevent the gas produced by the Li-ion battery from spreading around.

A Li-ion battery cooling system according to the invention includes a Li-ion battery and a liquid tank system. The liquid tank system includes a tank body and a liquid coolant supplying device. The tank body has an accommodating space, a liquid inlet, and an upper outlet. The liquid inlet and the upper outlet communicate with the accommodating space. The accommodating space is sealed except for the liquid inlet and the upper outlet. The liquid coolant supplying device is connected to the liquid inlet so as to continuously provide a liquid coolant into the accommodating space through the liquid inlet. The liquid coolant in the accommodating space overflows out of the tank body through the upper outlet. The Li-ion battery is disposed in the accommodating space and submerged in the liquid coolant. Thereby, the flowing liquid coolant can dissipate heat from the li-ion battery; the sealed accommodating space can prevent the gas produced by the Li-ion battery from spreading around.

Compared with the prior art, the liquid tank system according to the invention can provide an environment for effective heat dissipation and preventing gas from spreading around, which effectively solves the problems in the prior art that the Li-ion battery combustion and explosion and the toxic gases produced by the Li-ion battery are difficult to handle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
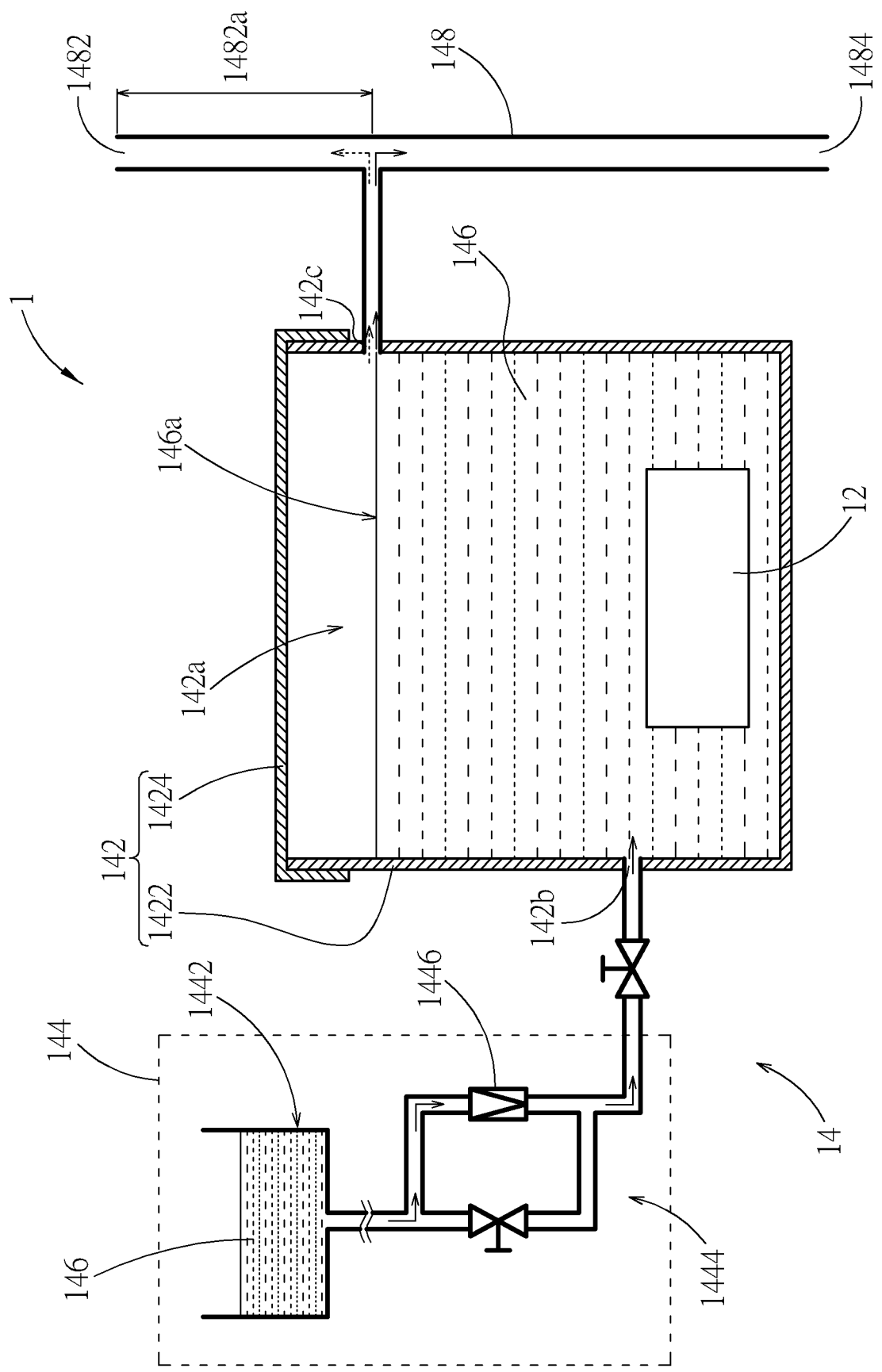
FIG. 1 is a schematic diagram illustrating the configuration of a Li-ion battery cooling system according to an embodiment.
Figure 2:
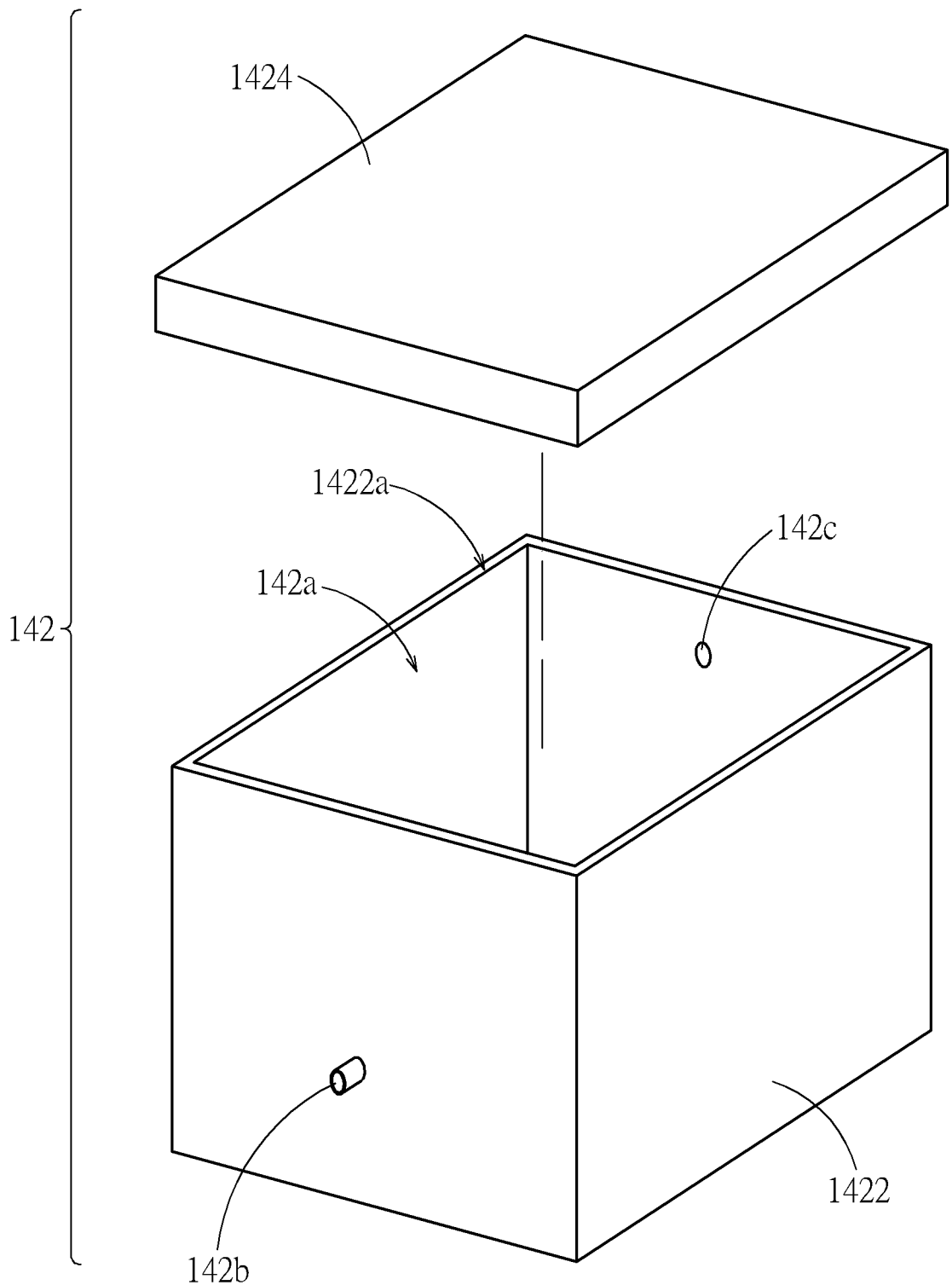
FIG. 2 is a schematic diagram illustrating a tank body of a liquid tank system of the Li-ion battery cooling system in FIG. 1.

Please refer to FIG. 1 and FIG. 2. A Li-ion battery cooling system 1 according to an embodiment includes a Li-ion battery 12 (shown by a block in FIG. 1) and a liquid tank system 14. The liquid tank system 14 includes a tank body 142 and a liquid coolant supplying device 144. The tank body 142 has an accommodating space 142a, a liquid inlet 142b, and an upper outlet 142c. The liquid inlet 142b and the upper outlet 142c communicate with the accommodating space 142a. The liquid coolant supplying device 144 is connected to the liquid inlet 142b so as to continuously provide a liquid coolant 146 to the accommodating space 142a through the liquid inlet 142b. The liquid coolant 146 in the accommodating space 142a continuously overflows out of the tank body 142 through the upper outlet 142c. In FIG. 1, the flowing direction of the liquid coolant 146 is indicated by arrows in solid lines. The Li-ion battery 12 is disposed in the accommodating space 142a and submerged in the liquid coolant 146; that is, the liquid level 146a formed by the liquid coolant 146 in the accommodating space 142a is higher than the Li-ion battery 12. Thereby, the flowing liquid coolant 146 dissipates heat from the Li-ion battery 12. Furthermore, as shown by FIG. 1, the accommodating space 142a is sealed except for the liquid inlet 142b and the upper outlet 142c. Therefore, if the Li-ion battery 12 produces gas (e.g. toxic gas produced due to burning), the gas will only be discharged through the upper outlet 142c (of which the flowing direction is indicated by arrows in dashed lines), so as to avoid the toxic gas from escaping everywhere.

In actual use of the Li-ion battery cooling system 1, the liquid coolant 146 may not be injected into the accommodating space 142a first, so that the Li-ion battery 12 can be tested in the accommodating space 142a. When the test fails (for example, the Li-ion battery 12 is short-circuited and generates much heat, or even starts to burn), the liquid coolant 146 can be injected into the accommodating space 142a to rapidly dissipate heat from Li-ion battery 12 so as to reduce the temperature of the Li-ion battery 12.

Furthermore, in practice, the inflow (through the liquid inlet 142b) and outflow (through the upper outlet 142c) of the liquid coolant 146 can be controlled so as to make the liquid level 146a not overwhelm the upper outlet 142c, so that the space within the accommodating space 142a above the liquid level 146a communicates with the exterior directly through the upper outlet 142c. This configuration helps the gas in the space above the liquid level 146a to smoothly flow out of the tank body 142 through the upper outlet 142c. For example, the toxic gas produced by the combustion of the Li-ion battery 12 submerged in the liquid coolant 146 will rise into the space above the liquid level 146a, so that the air pressure there increases to make the gas flow out of the tank body 142 through the upper outlet 142c. In addition, in practice, even if the liquid level 146a overwhelms the upper outlet 142c, the increase of the air pressure can increase the rate at which the liquid coolant 146 flows out of the tank body 142 through the upper outlet 142c, until the upper outlet 142c is exposed from the liquid level 146a. Afterward, the gas can escape from the tank body 142 through the exposed upper outlet 142c. Furthermore, in the embodiment, the upper outlet 142c is higher than the liquid inlet 142b, which helps the liquid coolant 146 flows form bottom to top, conducive to heat dissipation. In practice, the upper outlet 142c also can be lower than or equal to the liquid inlet 142b. This configuration still can allow the liquid coolant 146 to continuously flow and also has the effect of heat dissipation by forced convection.

In the embodiment, the Li-ion battery cooling system 1 further includes a drainage pipeline 148, connected to the upper outlet 142c. The drainage pipeline 148 has a vent 1482 and a drain 1484. The gas flowing out from the upper outlet 142c will be discharged through the vent 1482. The liquid coolant 146 flowing out from the upper outlet 142c will be discharged through the drain 1484. In practice, a filter can be disposed at the vent 1482 to filter out or reduce toxic substances in the discharged gas. Similarly, a filter can be disposed at the drain 1484 to filter out or reduce toxic substances in the discharged liquid coolant 146 (e.g. the portion of the toxic gas or substance generated by the combustion of Li-ion battery 12 dissolved in the liquid coolant 146). In addition, in practice, the height 1482a of the vent 1482 (i.e. the height difference from the upper outlet 142c to the vent 1482) can be determined according to the actual pressure of the liquid coolant 146 at the upper outlet 142c, so that when the liquid level 146a overwhelms the upper outlet 142c, the liquid coolant 146 flowing out from the upper outlet 142c will not overflow out from the vent 1482.

In practice, the liquid coolant supplying device 144 can be realized by a liquid coolant source 1442 and a supply pipeline 1444. The supply pipeline 1444 is connected to the liquid coolant source 1442 and the liquid inlet 142b. The liquid coolant source 1442 can be but not limited to a storage tower (e.g. water tower) which stores the liquid coolant 146 (e.g. water). The liquid coolant 146 in the storage tower is provided to the tank body 142 through the supply pipeline 1444. In practice, the liquid coolant supplying device 144 can use a pressurizing device (e.g. a pump) to increase the hydraulic pressure of the liquid coolant 146, so that the liquid coolant 146 can smoothly flow into the accommodating space 142a through the liquid inlet 142b and keep flowing (that is, flowing into accommodating space 142a from the liquid inlet 142b, and flowing out of the accommodating space 142a from the upper outlet 142c), or so that the flow rate of the liquid coolant 146 (flowing into the accommodating space 142a from the liquid inlet 142b, and flowing out of the accommodating space 142a from the upper outlet 142c) can be increased. Furthermore, in practice, the liquid coolant supplying device 144 can includes a control valve 1446, disposed on the supply pipeline 1444 corresponding to the liquid inlet 142b. The control valve 1446 is operable to control the input pressure (or flow rate) of the liquid coolant 146, so as to make the liquid level 146a not overwhelm the upper outlet 142c. For example, the control valve 1446 can be but not limited to a pressure-reducing valve.

In addition, in the embodiment, the tank body 142 is made of explosion-proof materials, so it can withstand explosion of the Li-ion battery 12 in a certain degree. Furthermore, in the embodiment, the tank body 142 includes a main body 1422 and a top cover 1424. The main body 1422 has an opening 1422a. The top cover 1424 openably seals the opening 1422a to form the accommodating space 142a. Therein, the liquid inlet 142b and the upper outlet 142c are disposed in the main body 1422. The main body 1422 and the top cover 1424 are pivotally connected; however, it is not limited thereto. For example, the main body 1422 and the top cover 1424 can be separated. For another example, the liquid inlet 142b is disposed on the main body 1422, and the upper outlet 142c is disposed on the top cover 1424.

Figure 3:
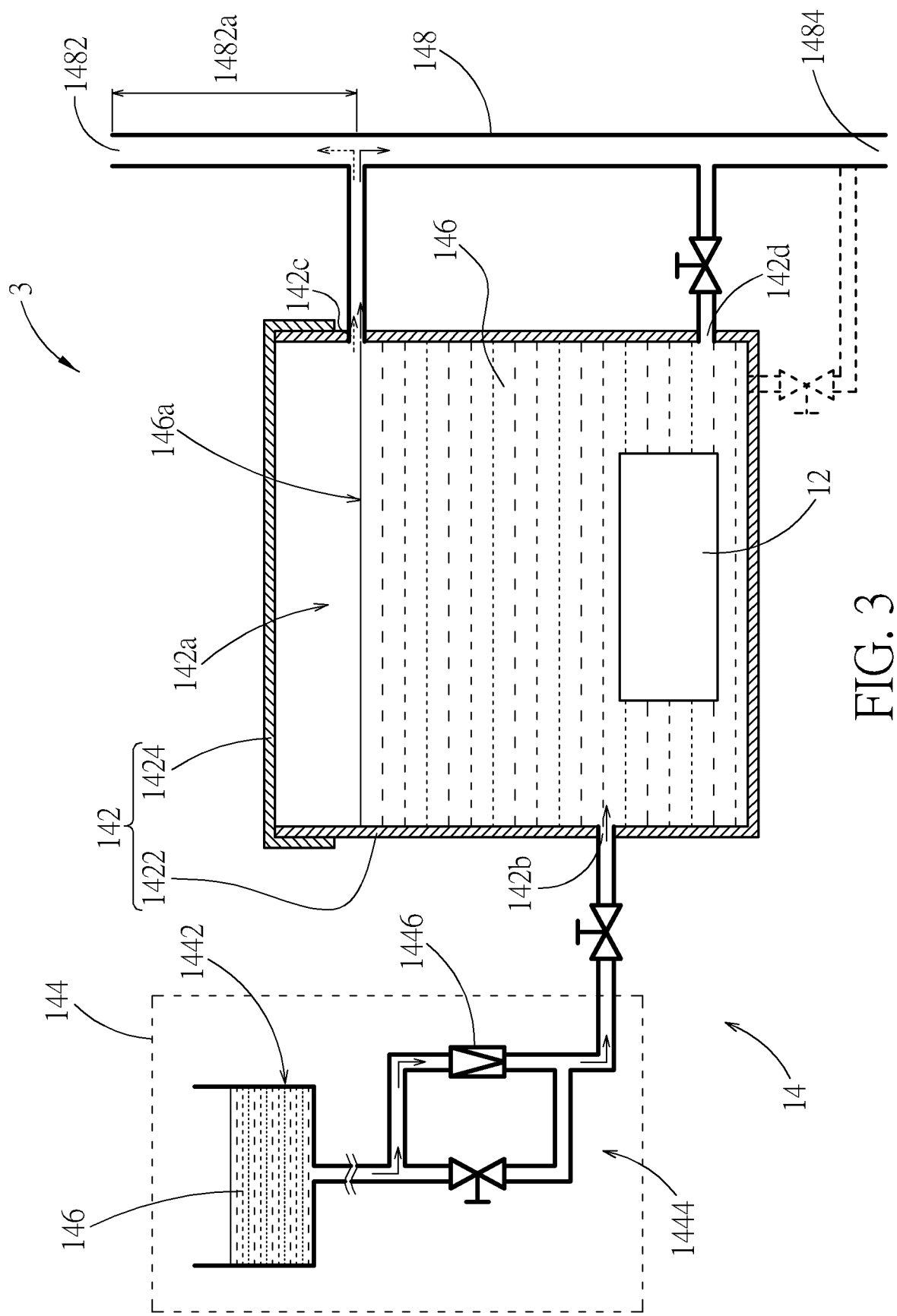
FIG. 3 is a schematic diagram illustrating the configuration of a Li-ion battery cooling system according to another embodiment.

Please refer to FIG. 3. A Li-ion battery cooling system 3 according to another embodiment as shown by FIG. 3 is substantially the same as the Li-ion battery cooling system 1. The Li-ion battery cooling system 3 uses the reference numbers of the Li-ion battery cooling system 1. For other descriptions about the Li-ion battery cooling system 3, please refer to the relevant descriptions of the Li-ion battery cooling system 1, which will not be described in addition. Compared with the Li-ion battery cooling system 1, the tank body 142 of the Li-ion battery cooling system 3 further includes a liquid outlet 142d, connected to the drainage pipeline 148. The liquid outlet 142d is lower than the upper outlet 142c. In actual use, the liquid outlet 142d can also be used with the upper outlet 142c for the liquid coolant 146 to flow out of the accommodating space 142a, so as to maintain the flowing of the liquid coolant 146 in the accommodating space 142a. For this case, the flow speed (or replacement speed) of the liquid coolant 146 is increased, which can enhance the heat dissipation efficiency. Furthermore, the liquid outlet 142d (e.g. disposed close to the bottom of the main body 1422) can be used only for draining the liquid coolant 146 in the accommodating space 142a; when the Li-ion battery cooling system 3 is operated to dissipate heat from the Li-ion battery 12, the liquid outlet 142d remains closed. Furthermore, in the embodiment, the liquid inlet 142b is higher than the liquid outlet 142d and lower than the upper outlet 142c.

In addition, in the embodiment, the liquid outlet 142d and the upper outlet 142c are disposed on a side wall of the main body 1422; however, it is not limited thereto. For example, the liquid outlet 142d is changed to be disposed on the bottom of the main body 1422 (as shown in dashed lines in FIG. 3). For another example, liquid outlets (i.e. including the liquid outlet 142d and the liquid outlet in dashed lines in FIG. 3) can be provided on both the side wall and bottom of the main body 1422. Therein, the liquid outlet on the bottom of the main body 1422 can also be used with the upper outlet 142c for the liquid coolant 146 to flow out of the accommodating space 142a, so as to maintain the flowing of the liquid coolant 146 in the accommodating space 142a, or can be used only for draining the liquid coolant 146 in the accommodating space 142a.

In an embodiment according to the invention, the technology of the present invention can be applied to in-vehicle devices, such as self-driving cars, electric cars, semi-autonomous cars, and so on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid tank system, comprising:
   a tank body, having an accommodating space, a liquid inlet, a liquid outlet, and an upper outlet, the liquid inlet, the liquid outlet, and the upper outlet communicating with the accommodating space, the liquid inlet is higher than the liquid outlet and lower than the upper outlet, the accommodating space being sealed except for the liquid inlet, the liquid outlet, and the upper outlet;
   a drainage pipeline, connected to the liquid outlet and the upper outlet, the drainage pipeline having a vent and a drain; and
   a liquid coolant supplying device, connected to the liquid inlet so as to continuously provide a liquid coolant into the accommodating space through the liquid inlet, the liquid coolant in the accommodating space overflowing out of the tank body through the upper outlet.

2. The liquid tank system according to claim 1, wherein the tank body comprises a main body and a top cover, the main body has an opening, and the top cover openably seals the opening to form the accommodating space.

3. The liquid tank system according to claim 2, wherein the liquid inlet and the upper outlet are disposed in the main body.

4. The liquid tank system according to claim 1, wherein the liquid coolant supplying device comprises a control valve, disposed corresponding to the liquid inlet.

5. The liquid tank system according to claim 4, wherein the liquid coolant in the accommodating space forms a liquid level, and the control valve is operated to make the liquid level not to overwhelm the upper outlet.

6. A Li-ion battery cooling system, comprising:
   a Li-ion battery; and
   a liquid tank system, comprising:
      a tank body, having an accommodating space, a liquid inlet, a liquid outlet, and an upper outlet, the liquid inlet, the liquid outlet, and the upper outlet communicating with the accommodating space, the liquid inlet is higher than the liquid outlet and lower than the upper outlet, the accommodating space being sealed except for the liquid inlet, the liquid outlet, and the upper outlet;
      a drainage pipeline, connected to the liquid outlet and the upper outlet, the drainage pipeline having a vent and a drain; and
      a liquid coolant supplying device, connected to the liquid inlet so as to continuously provide a liquid coolant into the accommodating space through the liquid inlet, the liquid coolant in the accommodating space overflowing out of the tank body through the upper outlet, the Li-ion battery being disposed in the accommodating space and submerged in the liquid coolant.

7. The Li-ion battery cooling system according to claim 6, wherein the tank body comprises a main body and a top cover, the main body has an opening, and the top cover openably seals the opening to form the accommodating space.

8. The Li-ion battery cooling system according to claim 7, wherein the liquid inlet and the upper outlet are disposed in the main body.

9. The Li-ion battery cooling system according to claim 6, wherein the liquid coolant supplying device comprises a control valve, disposed corresponding to the liquid inlet.

10. The Li-ion battery cooling system according to claim 9, wherein the liquid coolant in the accommodating space forms a liquid level, and the control valve is operated to make the liquid level not to overwhelm the upper outlet.

* * * * *